Dec. 6, 1960 F. W. YEAGLEY 2,963,664

HIGH FREQUENCY POWER DIVIDING APPARATUS

Filed April 30, 1958 2 Sheets-Sheet 1

INVENTOR
FRANK W. YEAGLEY
BY
Moses, Nolte, & Nolte
ATTORNEYS

INVENTOR
FRANK W. YEAGLEY
BY
Moses, Nolte, & Nolte
ATTORNEYS

United States Patent Office 2,963,664

Patented Dec. 6, 1960

2,963,664

HIGH FREQUENCY POWER DIVIDING APPARATUS

Frank W. Yeagley, Dallas, Tex., assignor to Continental Electronics Manufacturing Company, Dallas, Tex., a corporation of Texas Filed Apr. 30, 1958, Ser. No. 732,054

10 Claims. (Cl. 333—9)

The present invention relates to high frequency power dividing apparatus and more particularly to a device for continuous stepless division of radio frequency power without appreciable phase shift.

There are many applications in which it is required to divide high frequency or radio frequency power in a desired ratio between two or more loads, or to supply a definite portion of the power to a given load. Both loads may be useful loads, such as two amplifiers, or one load may be useful and the other a "waster" or dissipating load. It is generally desirable that a constant impedance be presented to the source and that the power dividing apparatus have a minimum dissipation so that there is no appreciable insertion loss when all the power is being fed to the useful load. It is one of the objects of the invention to satisfy these requirements.

The present invention provides apparatus for producing a continuous stepless division of radio frequency power in any desired ratio without appreciable loss. The apparatus comprises a pair of branch circuits connected in parallel at their input ends to the source, which may be a radio frequency power source. Each of the branch circuits include a first quarter wave length transformer which may be a linear quarter wave length coaxial or other type of transmission line connected directly in series with a second quarter wave length transformer such as a second quarter wave length transmission line having a variable characteristic impedance. It is understood that wherever quarter wave length lines are mentioned, that lines having an odd number of quarter wave lengths may be used. The inner conductors of the first transmission lines are connected together to the source at one end and at the other end each is connected to one conductor of the second lines. The outer conductors of the first lines and the other conductors of the second lines are connected together, and connected to the other terminal of the source which may be at ground potential. The output of each of the second lines is connected to a load. The loads preferably are purely resistive and have a resistance equal to the impedance of the source, to the characteristic impedance of the first transmission line, and also to the maximum characteristic impedance of the second transmission line. By varying the characteristic impedances of the second transmission lines differentially, the power supplied to the load may be given any desired ratio and the impedances of the second lines may be adjusted so that the impedance presented to the source always remains constant. Another characteristic of the invention is that the power supplied to the loads have the same phase.

The invention will be fully understood and other objects and advantages thereof will become apparent from the following description and the drawings wherein.

Figure 1:
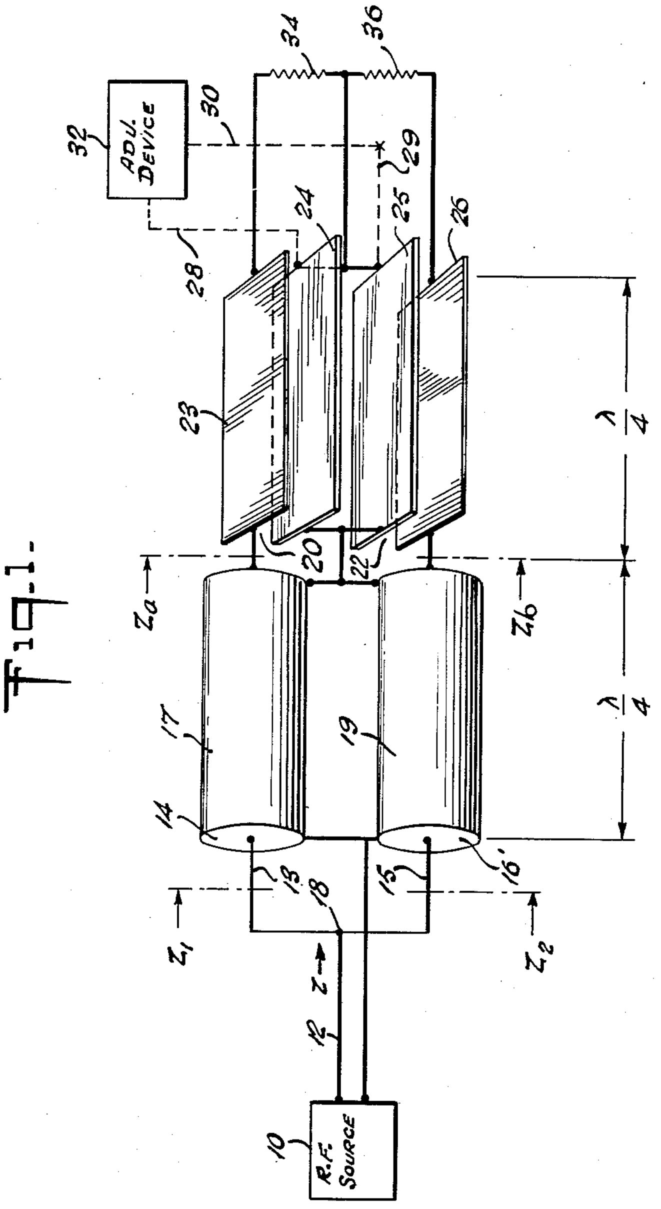
Fig. 1 is a schematic diagram of one embodiment of the invention.

Referring to the drawing, particularly Figure 1, high frequency power may be supplied from a radio frequency source 10 through an input line 12 having an input impedance Z. A pair of quarter wave length lines of any suitable type such as coaxial lines 14 and 16 have their ungrounded conductors 13 and 15 connected together at terminal 18 of the input line. The coaxial lines may have a characteristic impedance of $Z_0$ and input impedances of $Z_1$ and $Z_2$, respectively. Coaxial lines 14 and 16 are connected in series with a second pair of quarter wave length lines 20 and 22. Lines 20 and 22 may be of any configuration and are shown as being formed of flat strips 23 and 24 and 25 and 26. The outer strips or conductors 24 and 25 are connected together and may be at ground potential and also connected to the outer conductors 17 and 19 of the coaxial transmission lines. Lines 14 and 16 are placed close to lines 20 and 22 so that there is no appreciable electrical spacing therebetween. The spacing $S_3$ between strips 23 and 24 of line 20 and the spacing $S_4$ of strips 25 and 26 of line 22 are made variable and the variation of the spacings $S_3$ and $S_4$ are preferably adjusted differentially in a manner to be described hereinafter. For this purpose, strips 24 and 25, for example, may be provided with a mechanical connection 28 to an adjusting device 32. The adjusting device 32 may be of any form capable, by the use of cams or other known devices, to vary the spacing $S_3$ and $S_4$ differentially in such a manner that an increase in power to one load is accompanied by a corresponding decrease of power to the other load. A load 34 is connected across line 20 and another load 36 is connected across line 32. Loads 34, 36, preferably having equal impedance values $Z_L$. These loads may be any suitable devices such as resistors or amplifiers for utilizing the power from the source, or only one of the loads may be a utilizing device and the other may be a "waster" or dissipating load.

The apparatus is constructed so that the characteristic impedance of lines 20 and 22 can be varied from 0, or any other desired value, up to a value equal to $Z_0$, the characteristic impedance of lines 14 and 16 where $Z_0$ is equal to the impedance Z of the line or circuit 12 supplying power to the apparatus. By varying the characteristic impedance of lines 20 and 22 in a manner defined below, the power supplied to loads 34 and 36 may be divided in any desired ratio while a constant impedance $Z_0$ equal to the impedance Z of circuit 12 is presented at terminal 18. The manner in which this is done may be explained as follows:

The input ends 13 and 15 of the non-variable sections 14 and 16 are in parallel and present an impedance Z of $$Z=\frac{Z_1Z_2}{Z_1+Z_2}$$

where $Z_1$ and $Z_2$ are the input impedances as seen at the input end of each of lines 14, 16. These impedances are a function of the characteristic impedance $Z_0$ of each line and its load impedance, or $Z_1=Z_0^2/Z_a$, where $Z_a$ is the impedance terminating line 14. By similar reasoning $Z_2=Z_0^2/Z_b$ where $Z_b$ is the terminating impedance for line 16.

Combining these formulae, we have $$Z=\frac{(Z_0^2)/(Z_a)(Z_0^2)/(Z_b)}{\frac{Z_0^2}{Z_a}+\frac{Z_0^2}{Z_b}}$$

which is $$Z=\frac{Z_0^4}{Z_0^2Z_a+Z_0^2Z_b}=\frac{Z_0^3}{Z_a+Z_b}$$

By similar methods $Z_a=Z_3^2/Z_L$ and $Z_b=Z_4^2/Z_L$, where $Z_3$ and $Z_4$ are the impedances of the variable impedance lines 20, 22 and $Z_L$ is the terminating impedance of each of the variable lines. Substituting these values in (2) yields $$Z=\frac{Z_0^2}{\frac{Z_3^2}{Z_L}+\frac{Z_4^2}{Z_L}}=\frac{Z_0^2 Z_L}{Z_3^2+Z_4^2}=\frac{Z_0^3}{Z_3^2+Z_4^2}$$

when $Z_0=Z_L$.

An approximate but useable formula for strip lines is $$Z_S=377\frac{S}{W}$$

where $Z_S$ is the impedance of the strip line, W is width of the strip and S is the spacing of the strip from the ground plane. In this case $$W_3=377\frac{S_3}{W_3}$$

and $$Z_4=377\frac{S_3}{W}$$

It simplifies the mathematics to assume some finite values and work out a specific case, for example, $W_3=W_4$ and 1 and $Z_L=50$ and then the above equation becomes $$Z=\frac{Z_0^3}{(377)^2S_3^2+(377)^2S_4^2}$$

or $$Z=\frac{Z_0^3}{(377)^2(S_3^2+S_4^2)}$$

and since in this case we want Z to be 50, we can write $$50=\frac{(50)^3}{377^2(S_3^2+S_4^2)}$$

or $$S_3^2+S_4^2=\frac{50^2}{377^2}=\frac{50^2}{377}=(0.133)^2=.0177$$

(a constant).

When spacing $S_3^2=0$, $S_4^2=.0177$ and $S_4=0.133$ inch, and $Z_4=377\times0.133=50$ ohms, and conversely when $S_4^2=0$, $S_3=0.133$ inch, and $Z_3=50$ ohms.

"Zero spacing" of $Z_3$ is a short circuit and the input impedance at $Z_1$ is infinite. When this condition exists no power enters line 14 at $Z_1$, $Z_4$ is 50 ohms, $Z_2$ is 50 ohms and all the power is transmitted through $Z_2$ and $Z_4$, i.e. lines 16 and 22, to load 36 terminating line 22. Since all impedances are matched and the components are assumed perfect, all the power is transmitted through this branch without loss. Similar conditions exist in the other branch when $Z_4$ is a short circuit.

A cam or other actuating mechanism 32 can be designed to operate each of the ground planes so that $S_3^2+S_4^2=0.0177$ at any points between 0 and 0.133 inch. There are no flexible, moving, or sliding inner conductors. The moveable ground planes require good contact at the ends only since the edges are parallel to the lines of normal current flow. This condition is similar to that of a slotted line when the slot is parallel to the axis, and simplifies the mechanical construction in some cases.

Power will divide at Z into the two branches in inverse proportion to the impedances presented at that point by each branch. For example, when one of the variable sections 20 or 22 is at zero spacing the impedance at Z of that branch is infinite due to the inversion characteristic of the quarter wavelength section 14 or 15 between the variable section and terminal 18. If the spacing in the second branch is at that time such that the characteristic impedance of the variable section is equal to the desired input impedance the impedances are matched all the way through the second branch and all power applied at Z or terminal 18 will flow to the load terminating the second branch.

The branch which is approaching zero spacing is also approaching zero impedance at the input of the variable line section where the spacing is being reduced. The power entering this branch is also approaching zero and there is no trouble with voltage breakdown in the variable sections 20, 22.

The same conditions apply for properly controlled intermediate positions, which allows a smooth transfer of power from one load to the other without phase shift, and with constant input impedance.

Figure 2:
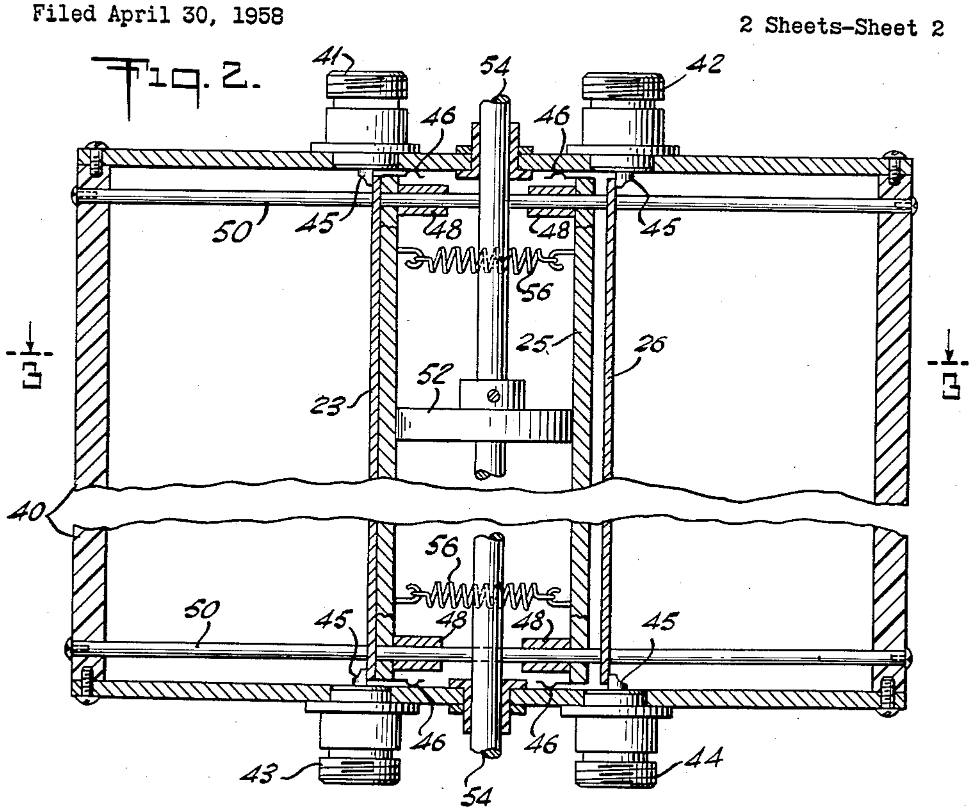
Fig. 2 is a top sectional view of one embodiment of the variable transmission line section.
Figure 3:
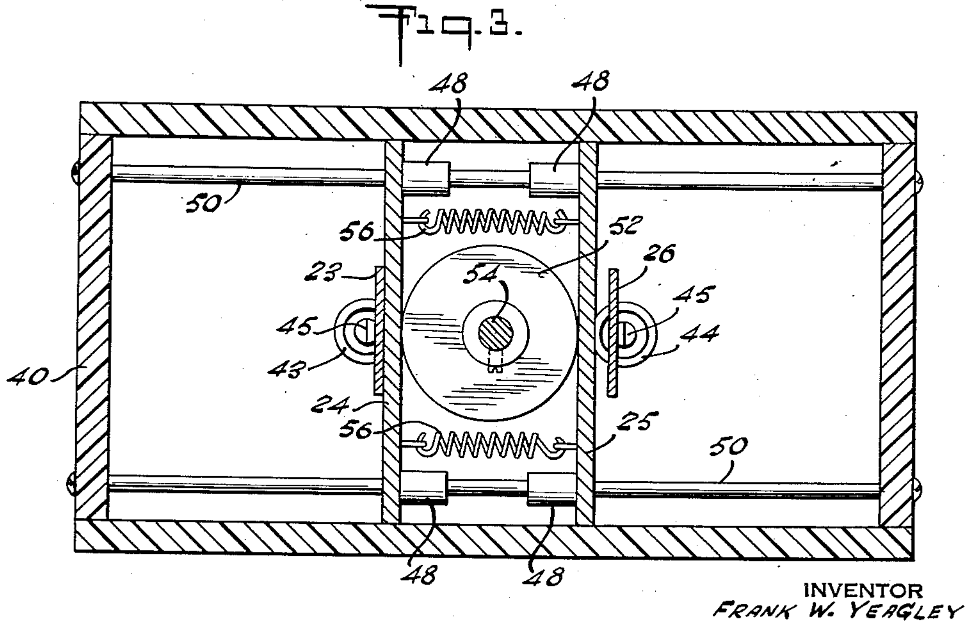
Fig. 3 is a sectional view taken along line 3—3 of Fig. 2.

Figs. 2 and 3 show one example of the manner in which the construction of the variable line sections 20 and 22 may be carried out. A closed housing 40 preferably formed of conductive material is provided with a plurality of conventional coaxial lines connectors 41—44. One pair of these connectors are for connection to the load and the other pair for connection to the fixed line sections 14 and 16, as is quite apparent from Fig. 1. The inner conductors of the connectors are joined to the fixed plates 23 and 26. Closely juxtaposed to plates 23 and 26 are the movable ground plane plates 24 and 25, which are provided with slidable contacts 46 on the walls of the housing, and thus plates 24 and 25 are connected also to the outer conductors of the connectors 41—44.

Plates 22 and 24 are slidably mounted by means of bearings 48 on four rods 50 which may be located at the corners of the housing 40 and suitably fixed in the housing by screws or any other means. A shaped cam 52 is suitably fixed on a shaft 54 which may be provided at one end with means (not shown) for turning it. A plurality of springs 56 are attached to the ground plates 24 and 25 for holding them in contact with cam 52. Thus plates 24 and 25 are held so that they remain parallel to each other and to the fixed plates 23 and 26 while being moved. It is evident that additional means may be used for insuring such parallelism. Each of the ground plates can be moved from a position which one of them, for example plate 24, is in contact with the adjoining fixed plate, for example plate 23, to a position at which there is a desired maximum spacing between the ground plate and the adjoining fixed plate. The fixed plates 23 and 26 are completely isolated and shielded from each other. When the loads 34, 36 are connected to one pair of connectors, say 41, 42, and coaxial lines 14 and 16 are connected to the other pair of connectors, say 43 and 44, in the manner schematically illustrated in Figure 1, the power may be divided between the two loads in the manner which has been fully explained above, and the division of the power between can be varied continuously.

For the sake of simplicity I have schematically illustrated and described only one embodiment of my invention. It will be apparent, however, that many variations and modifications of the apparatus may be utilized. For example, the quarter wavelength, or multiple quarter wavelength, sections may obviously take many known forms such as various types of real and artificial transmission lines and the characteristic impedances of the variable quarter wavelength sections may be varied in different ways which are apparent to those skilled in the art. The scope of my invention, therefore, is not to be construed as being limited except as defined in the following claims.

I claim:

1. Apparatus for producing a division of radio frequency power comprising a source of power of a given radio frequency, an input circuit connected to said power source, a pair of branch circuits connected in parallel at their input ends, each of said branch circuits including first and second transmission lines having a length equal to an odd number of quarter wavelengths and connected in series, the input ends of the first transmission lines being connected to one point of the input circuit, a load connected across the output of each of said second transmission lines, means for adjusting the characteristic impedances of the two second transmission lines so that the impedance presented by the two branch circuits to the input circuit remains substantially constant throughout the range of adjustment of the second lines.

2. Apparatus according to claim 1, wherein the impedance of each load is equal to the maximum characteristic impedance of each of the second lines and the characteristic impedance $Z_0$ of each of the first lines.

3. Apparatus according to claim 2, wherein the second lines have a characteristic impedance variable from $Z_0$ to zero.

4. Apparatus according to claim 3, wherein the impedance presented by the input circuit at said one point thereof is equal to $Z_0$.

5. Apparatus for producing a continuous stepless division of radio frequency power without appreciable loss, comprising a power input line for supplying electrical waves of a given radio frequency, a pair of branch circuits connected in parallel at their input ends, each of said branch circuits including a first quarter wave length transmission line and a second quarter wave length transmission line connected in series, the input ends of the first transmission lines being connected to one conductor of the input line, a load connected across the output of each of said second transmission lines, and means for varying the characteristic impedance of the two second transmission lines differentially and continuously at such a rate that the impedance presented by the two branch circuits to the input line remains susbtantially constant throughout the range of variation of the second lines.

6. Apparatus according to claim 5, wherein the impedance of the input line, the characteristic impedance of each first line, the maximum characteristic impedance of each second line, and the impedance of each load are equal to one another.

7. Apparatus according to claim 6, wherein the second lines are flat strip lines having variable spacings between the strips of each line.

8. Apparatus according to claim 7, wherein said first transmission lines are coaxial lines having their outer conductors connected together and connected to one strip of each of the second lines, the inner conductors of the first lines being connected at their input ends to the input line and being each connected at its output end to the other strip of one of the second lines.

9. Apparatus according to claim 5, wherein one conductor of each of said second lines comprise a pair of interconnected grounded plates parallel and opposite to each other, the other conductor of each second line being a second plate parallel to and outside the first mentioned plates, said means for varying the characteristic impedance of said second lines includes a shaped cam interposed between the first mentioned plates, means for holding said first plates against the periphery of the cam, and a shaft fixed to said cam so that rotation of said shaft differentially varies the spacing between the plates constituting the two second lines.

10. Apparatus for producing a continuous stepless division of radio frequency power in any desired ratio comprising a radio frequency power source, a pair of branch circuits connected in parallel at their input ends, each of said branch circuits including a first quarter wave length transformer and a second quarter wave length transformer connected in series, the input ends of the first transformers being connected to one terminal of the source, a load connected across the output of each of said second transformers, said second transformers having differentially adjustable characteristic impedances of such values that the impedance presented by the two branch circuits to the source remains substantially constant throughout the range of adjustment of the second transformers, whereby power in the same phase is divided between the loads in a desired ratio.

References Cited in the file of this patent

UNITED STATES PATENTS

| | | |
|---|---|---|
| 2,397,543 | Fuchs | Apr. 2, 1946 |
| 2,679,631 | Korman | May 25, 1954 |